United States Patent
Moon

(10) Patent No.: US 11,583,998 B2
(45) Date of Patent: Feb. 21, 2023

(54) ROBOT AND METHOD OF CONTROLLING SAME

(71) Applicant: LG ELECTRONICS INC., Seoul (KR)

(72) Inventor: Yoonji Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 318 days.

(21) Appl. No.: 16/821,420

(22) Filed: Mar. 17, 2020

(65) Prior Publication Data

US 2021/0046638 A1 Feb. 18, 2021

(30) Foreign Application Priority Data

Aug. 14, 2019 (KR) ........................ 10-2019-0099416

(51) Int. Cl.
*B25J 11/00* (2006.01)
*B25J 9/00* (2006.01)
*B25J 9/16* (2006.01)
*B25J 19/02* (2006.01)

(52) U.S. Cl.
CPC ............. *B25J 9/0003* (2013.01); *B25J 9/161* (2013.01); *B25J 9/163* (2013.01); *B25J 9/1697* (2013.01); *B25J 11/0005* (2013.01); *B25J 11/0015* (2013.01); *B25J 19/023* (2013.01); *B25J 19/026* (2013.01)

(58) Field of Classification Search
USPC .................................................. 700/245–264
See application file for complete search history.

(56) References Cited

U.S. PATENT DOCUMENTS

| 7,065,490 B1 * | 6/2006 | Asano ................... G10L 13/033 704/270 |
| 7,076,331 B1 * | 7/2006 | Nagatsuka ............. A63H 11/00 700/258 |
| 7,139,642 B2 * | 11/2006 | Kamoto ................. G06N 3/008 901/50 |
| 7,689,319 B2 * | 3/2010 | Kanda .................... B25J 9/1671 700/245 |
| 10,391,636 B2 * | 8/2019 | Breazeal ................ B25J 9/0003 |
| 11,279,041 B2 * | 3/2022 | Mahoor ................. B25J 11/001 |
| 2001/0001318 A1 * | 5/2001 | Kamiya ................... F24F 11/30 700/264 |
| 2002/0158599 A1 * | 10/2002 | Fujita ..................... G06N 3/008 704/E15.045 |
| 2004/0153211 A1 * | 8/2004 | Kamoto ................. G06N 3/008 700/245 |
| 2004/0249510 A1 * | 12/2004 | Hanson ................ B25J 11/0015 700/245 |
| 2007/0192910 A1 * | 8/2007 | Vu .......................... B25J 19/06 901/17 |

(Continued)

FOREIGN PATENT DOCUMENTS

EP  3373301 A1 *  9/2018  ............ B25J 11/001

*Primary Examiner* — Jonathan L Sample
(74) *Attorney, Agent, or Firm* — Ked & Associates, LLP

(57) ABSTRACT

Disclosed herein is a robot including an output interface including at least one of a display or a speaker, and a processor configured to acquire output data of a predetermined playback time point of content output via the robot or an external device, recognize a first emotion corresponding to the acquired output data, and control the output interface to output an expression based on the recognized first emotion.

20 Claims, 11 Drawing Sheets

(56) References Cited

U.S. PATENT DOCUMENTS

| | | | |
|---|---|---|---|
| 2008/0059158 A1* | 3/2008 | Matsuo | H04M 1/21 704/E11.001 |
| 2011/0137137 A1* | 6/2011 | Shin | A61B 5/0059 600/301 |
| 2012/0239196 A1* | 9/2012 | Olivier, III | G06F 3/012 901/1 |
| 2013/0066468 A1* | 3/2013 | Choi | B25J 11/008 901/1 |
| 2014/0222206 A1* | 8/2014 | Mead | G02B 5/20 700/259 |
| 2015/0100157 A1* | 4/2015 | Houssin | B25J 11/001 901/46 |
| 2017/0228520 A1* | 8/2017 | Kidd | G16H 20/13 |
| 2017/0266812 A1* | 9/2017 | Thapliya | B25J 9/0003 |
| 2017/0352351 A1* | 12/2017 | Kimura | B25J 13/089 |
| 2018/0085928 A1* | 3/2018 | Yamato | B25J 11/001 |
| 2018/0136615 A1* | 5/2018 | Kim | B25J 11/001 |
| 2018/0165570 A1* | 6/2018 | Son | G06N 3/04 |
| 2018/0178372 A1* | 6/2018 | Lee | G06V 20/10 |
| 2018/0281196 A1* | 10/2018 | Sakai | G06V 40/20 |
| 2018/0366121 A1* | 12/2018 | Funazukuri | G10L 15/22 |
| 2019/0015982 A1* | 1/2019 | Kou | A63H 11/00 |
| 2019/0070735 A1* | 3/2019 | Tappeiner | G10L 17/00 |
| 2019/0193273 A1* | 6/2019 | Favis | B25J 11/0015 |
| 2019/0337157 A1* | 11/2019 | Sun | G10L 25/63 |
| 2019/0342243 A1* | 11/2019 | Lee | H04M 1/725 |
| 2019/0366557 A1* | 12/2019 | Gewickey | G06N 5/046 |
| 2019/0389058 A1* | 12/2019 | Hayashi | B25J 9/0003 |
| 2020/0047348 A1* | 2/2020 | Park | G10L 25/63 |
| 2020/0050173 A1* | 2/2020 | Scherer | B25J 11/001 |
| 2020/0086496 A1* | 3/2020 | Shin | G10L 25/63 |
| 2020/0114521 A1* | 4/2020 | Mahoor | G06F 3/147 |

* cited by examiner

ROBOT AND METHOD OF CONTROLLING SAME

CROSS-REFERENCE TO RELATED APPLICATION

This application claims priority under 35 U.S.C. § 119 to Korean Application No. 10-2019-0099416 filed on Aug. 14, 2019, whose entire disclosure is hereby incorporated by reference.

BACKGROUND

1. Field

The present disclosure relates to a robot and, more particularly, to a robot for recognizing emotion on content output via the robot and performing operation based on the recognized emotion, and a method of controlling the same.

2. Background

A robot may refer to a machine that automatically processes or operates a given task by its own ability. The application fields of robots are generally classified into industrial robots, medical robots, aerospace robots, and underwater robots. Recently, communication robots that can communicate with humans by voices or gestures have been increasing.

Such communication robots may include various types of robots such as a guidance robot disposed at a particular place to show various types of information to users and a home robot provided in the home. In addition, the communication robots may include an educational robot for guiding or assisting study of a learner through interaction with the learner.

The communication robot may provide various content according to a user's request. For example, the communication robot may output content in the form of graphics via a display or output content in the form of sound through a speaker.

Meanwhile, since a user such as an infant or a child has relatively low concentration, there is a need for a method of improving the concentration of the user, by more efficiently delivering content output via the communication robot to the user.

BRIEF DESCRIPTION OF THE DRAWINGS

The embodiments will be described in detail with reference to the following drawings in which like reference numerals refer to like elements wherein.

DETAILED DESCRIPTION

Figure 1:
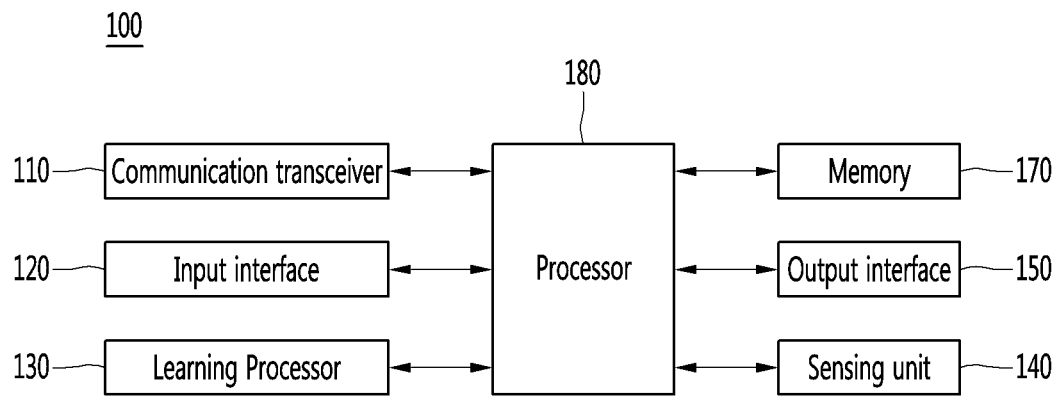
FIG. 1 illustrates an AI device including a robot according to an embodiment of the present disclosure.

A robot may refer to a machine that automatically processes or operates a given task by its own ability. In particular, a robot having a function of recognizing an environment and performing a self-determination operation may be referred to as an intelligent robot. Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method. The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an AI device including a robot according to an embodiment of the present disclosure. The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180. The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data. At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200. At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors. Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense. At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation. To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information. The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
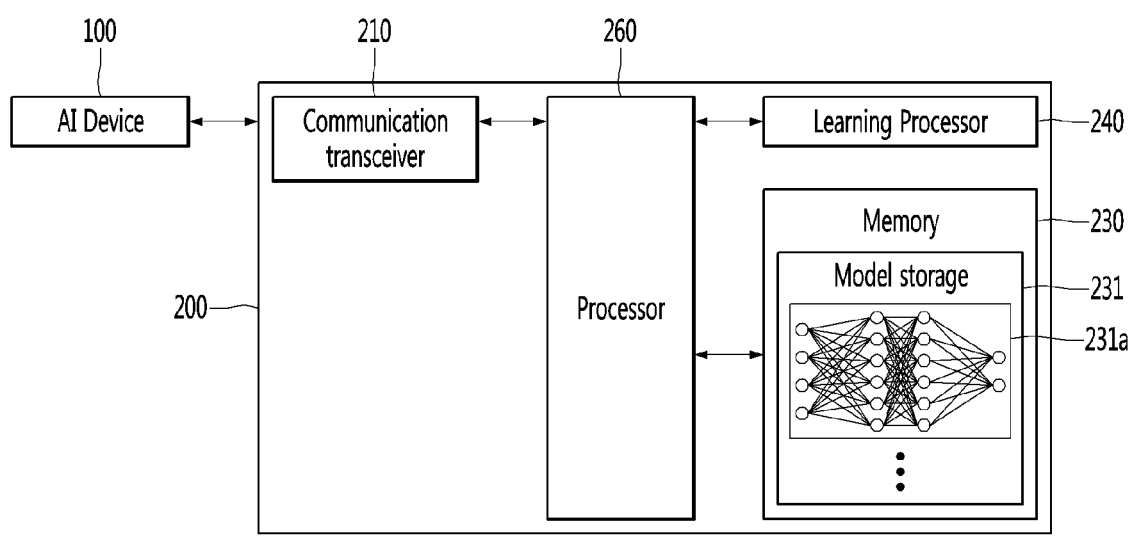
FIG. 2 illustrates an AI server connected to a robot according to an embodiment of the present disclosure.

FIG. 2 illustrates an AI server 200 connected to a robot according to an embodiment of the present disclosure. Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like. The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
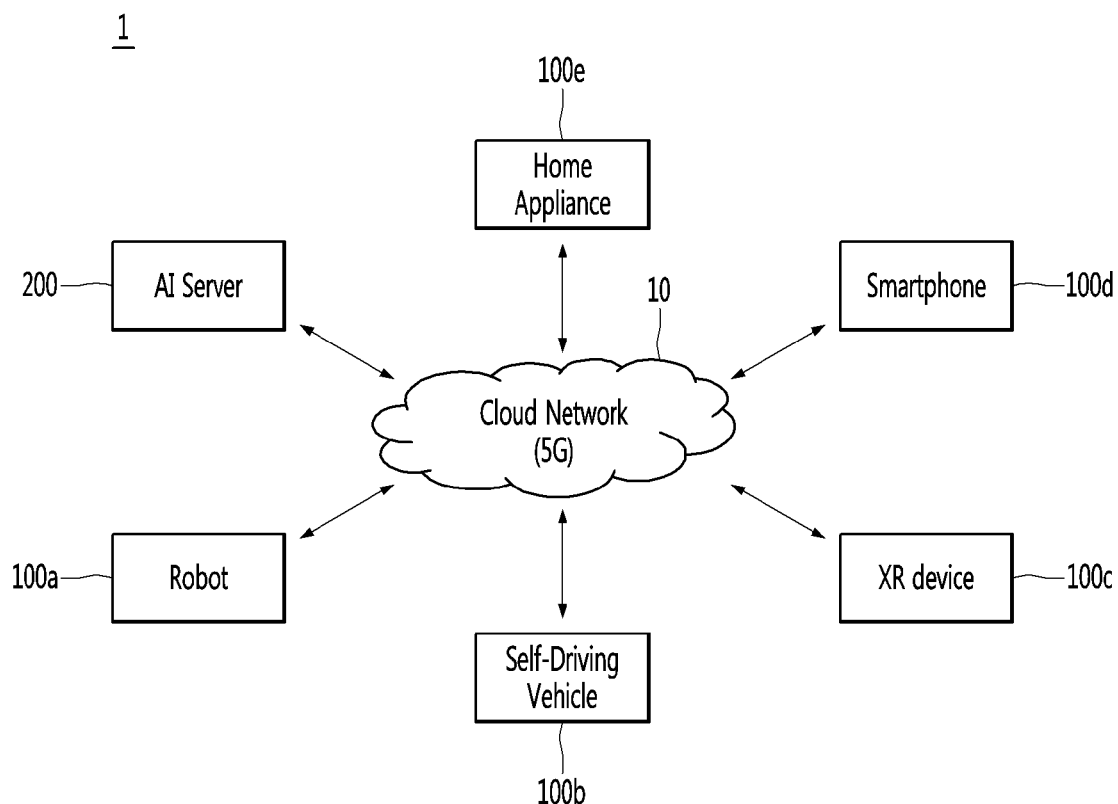
FIG. 3 illustrates an AI system including a robot according to an embodiment of the present disclosure.

FIG. 3 illustrates an AI system 1 according to an embodiment of the present disclosure. Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data. The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

The robot 100a, to which the AI technology is applied, may be implemented as a guide robot, a carrying robot, a cleaning robot, a wearable robot, an entertainment robot, a pet robot, an unmanned flying robot, or the like. The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation. The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

Figure 4:
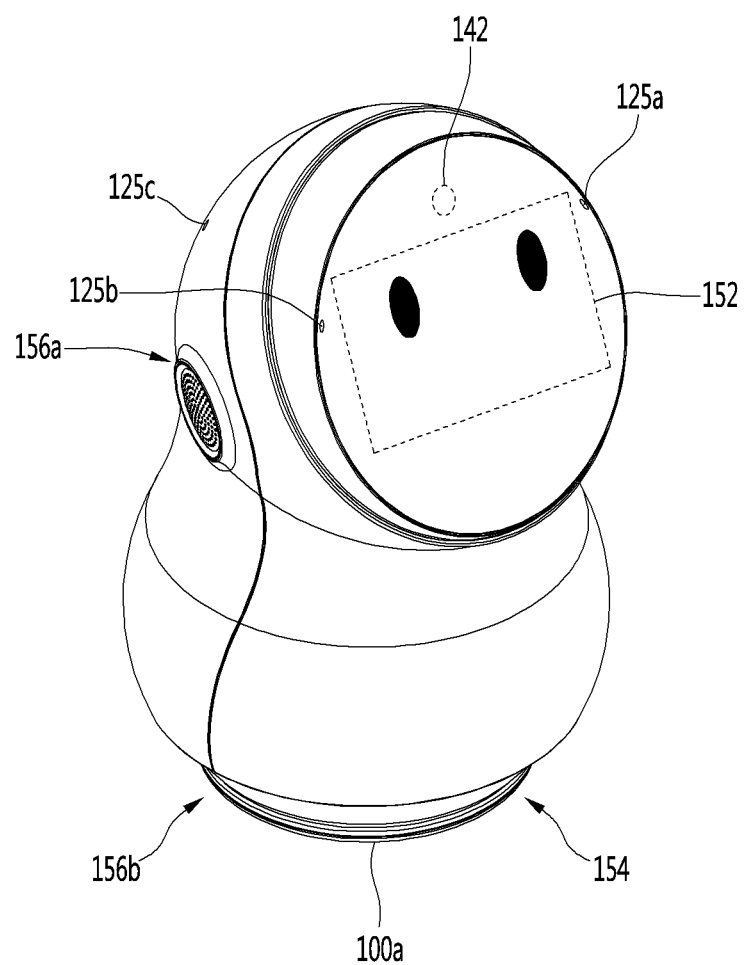
FIG. 4 is a perspective view of a robot according to an embodiment of the present disclosure.

FIG. 4 is a perspective view of a robot according to an embodiment of the present disclosure. Referring to FIG. 4, the robot 100a may refer to a communication robot for providing information or content to a user through communication or interaction with the user or performing operation of inducing a particular action. For example, the robot 100a may be a home robot disposed in the home. Such a home root may perform operation of providing various types of information or content to the user through interaction with a user or monitoring an event occurring in the home.

In order to perform the above-described operation, the robot 100a may include input/output units such as a camera 142 for acquiring an image of a user or an ambient image of a robot, at least one microphone 124 (see FIG. 5) for acquiring user's speech or ambient sound of the robot, a display 152 for outputting graphics or text, a sound output unit 154 (e.g., a speaker) for outputting speech or sound, and a light output unit 156 for outputting light of a color or pattern mapped to a particular event or situation.

The robot 100a may include at least one microphone holes 125a to 125c formed in an outer surface of a cover (or a case), in order to smoothly acquire external sound of the robot through the at least one microphone 124 implemented therein. Each of the microphone holes 125a to 125c may be formed at a position corresponding to any one microphone 124, and the microphone 124 may communicate with the outside through the microphone holes 125a to 125c. Meanwhile, the robot 100a may include a plurality of microphones spaced apart from each other. In this case, the robot 100a may detect a direction in which sound is generated using the plurality of microphones.

The display 152 may be disposed to face one surface from the robot 100a. Hereinafter, a direction that the display 152 faces is defined as a front side of the robot 100a. Meanwhile, although the sound output unit 154 is shown as being disposed at the lower portion of the robot 100a, the position of the sound output unit 154 may be variously changed according to embodiments.

The light output unit 156 is implemented as a light source such as a light emitting diode (LED) to represent the state or event of the robot 100a through a color or output pattern change. Although first light output units 156a disposed at both surfaces of the robot 100a and a second light output unit 156b disposed at the lower portion of the robot 100a are shown in FIG. 4, the number of light output units 156 and the placement positions thereof may be variously changed.

Although not shown, the robot 100a may further include a movement unit (traveling unit) for moving one position to another position. For example, the movement unit may include at least one wheel and a motor for rotating the wheel.

Figure 5:
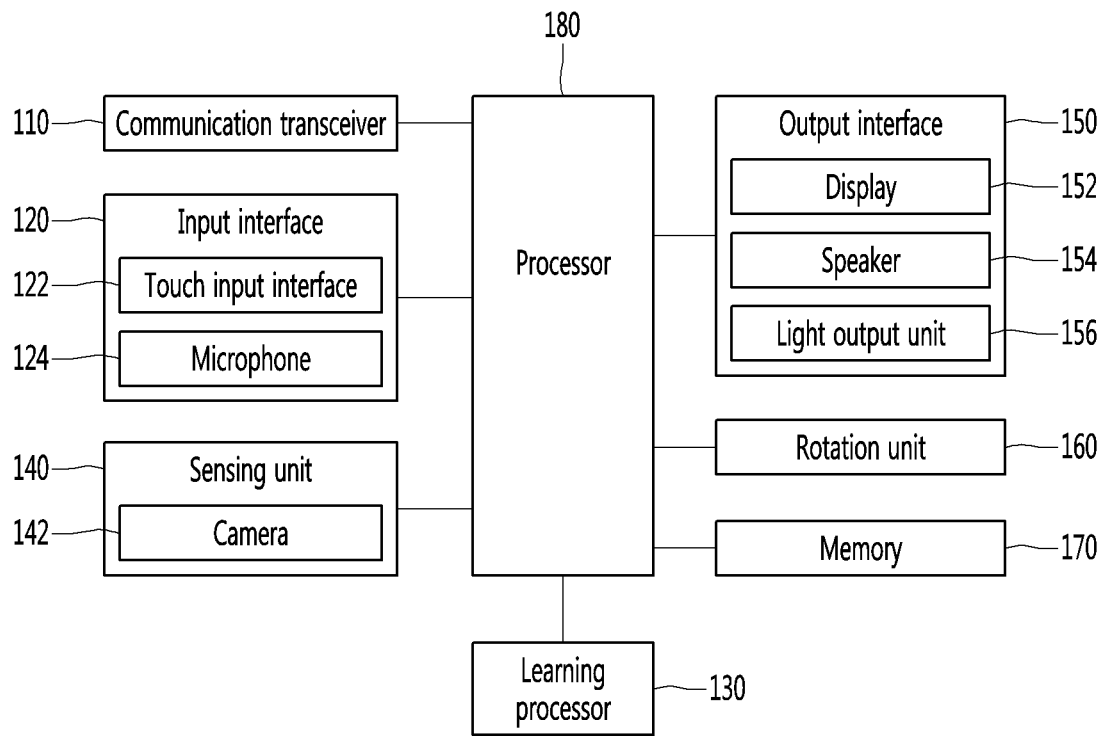
FIG. 5 is a view showing the control configuration of a robot according to an embodiment of the present disclosure.

FIG. 5 is a block diagram showing the control configuration of a robot according to an embodiment of the present disclosure. Referring to FIG. 5, the robot 100a may include a communication unit 110, an input unit 120, a learning processor 130, a sensing unit 140, an output unit 150, a rotation unit 160, a memory 170 and a processor 180. The components shown in FIG. 4 are examples for convenience of description and the robot 100a may include more or fewer components than the components shown in FIG. 4.

Meanwhile, the description related to the AI device 100 of FIG. 1 is similarly applicable to the robot 100a of the present disclosure and thus a repeated description of FIG. 1 will be omitted.

The communication unit 110 may include communication modules for connecting the robot 100a with a server, a mobile terminal and another robot over a network. Each of the communication modules may support any one of the communication technologies described above with reference to FIG. 1.

For example, the robot 100a may be connected to the network through an access point such as a router. Therefore, the robot 100a may provide various types of information acquired through the input unit 120 or the sensing unit 140 to the server or the mobile terminal over the network. In addition, the robot 100a may receive information, data, commands, etc. from the server or the mobile terminal.

The input unit 120 may include at least one input parts for acquiring various types of data. For example, the at least one input parts may include a physical input unit such as a button or a dial, a touch input unit 122 such as a touchpad or a touch panel, a microphone 124 for receiving user's speech or ambient sound of the robot 100a. The user may input various types of requests or commands to the robot 100a through the input unit 120.

The sensing unit 140 may include at least one sensor for sensing a variety of ambient information of the robot 100a. For example, the sensing unit 140 may include a camera 142 and various sensors such as a proximity sensor, an illuminance sensor, a touch sensor and a gyro sensor (gyroscope).

The camera 142 may acquire the ambient image of the robot 100a. In some embodiments, the processor 180 may acquire an image including a user's face through the camera 142 to recognize the user or acquire the gesture or facial expression of the user.

The proximity sensor may detect that an object such as a user approaches the robot 100a. For example, when approaching of the user is detected by the proximity sensor, the processor 180 may output an initial screen or initial speech through the output unit 150, thereby inducing the user to use the robot 100a.

The illuminance sensor may detect the brightness of a space in which the robot 100a is disposed. The processor 180 may control the components to perform various operations based on the result of detection of the illuminance sensor and/or time-of-day information.

The touch sensor may detect that a portion of the body of the user is brought into contact with a predetermined area of the robot 100a. The gyro sensor may detect the rotation angle or the slope of the robot 100a. The processor 180 may recognize a direction that the robot 100a faces or detect external impact based on the result of detection of the gyro sensor.

The output unit 150 may output various types of information or content related to operation or state of the robot 100a or various types of services, programs or applications executed in the robot 100a. In addition, the output unit 150 may output various types of messages or information for performing interaction with the user.

The output unit 150 may include the display 152, the speaker 154 and the light output unit 156. The display 152 may output the above-described various types of information, messages or content in the form of graphics. In some embodiments, the display 152 may be implemented as a touchscreen along with the touch input unit 122. In this case, the display 152 may perform an input function as well as an output function. The speaker 154 may output the various types of information, messages or content in the form of speech or sound.

The light output unit 156 may be implemented as a light source such as an LED. The processor 180 may represent the state of the robot 100*a* through the light output unit 156. In some embodiments, the light output unit 156 is an auxiliary output unit and may provide various types of information to the user along with the display 152 and/or the speaker 154.

The rotation unit 160 may include a first motor for rotating the robot 100*a* about a vertical axis. The processor 180 may control the first motor included in the rotation unit 160 to rotate the robot 100*a*, thereby changing the direction that the display 152 and the camera 142 of the robot 100*a* face in a left-and-right direction.

In some embodiments, the rotation unit 160 may further include a second motor for tilting the robot 100*a* by a predetermined angle in a forward-and-backward direction. The processor 180 may control the second motor to tilt the robot 100*a*, thereby changing a direction that the display 152 and the camera 142 face in an upward-and-downward direction.

Various types of data such as control data for controlling operation of the components included in the robot 100*a*, data for performing operation based on information acquired through the input unit 120 or information acquired through the sensing unit 140, etc. may be stored in the memory 170.

In addition, program data of software modules or applications executed by at least one processor or controller included in the processor 180 may be stored in the memory 170. The memory 170 may include various storage devices such as a ROM, a RAM, an EEPROM, a flash drive, a hard drive, etc. in hardware.

The processor 180 may include at least one processor or controller for controlling operation of the robot 100*a*. For example, the processor 180 may include at least one CPU, application processor (AP), microcomputer, integrated circuit, application specific integrated circuit (ASIC), etc.

Figure 6:
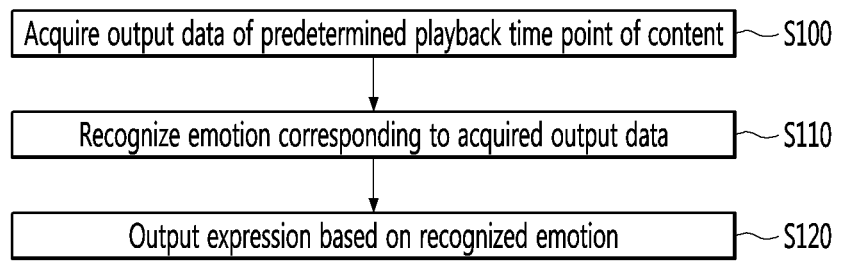
FIG. 6 is a flowchart schematically illustrating a method of controlling a robot according to an embodiment of the present disclosure.

FIG. 6 is a flowchart schematically illustrating a method of controlling a robot according to an embodiment of the present disclosure. Referring to FIG. 6, the robot 100*a* may acquire output data of a predetermined playback time pint of content which is being output (S100). The content may be output via the output unit 150 of the robot 100*a*, e.g., the display 152 and/or the speaker 154.

In some embodiments, the content may be output via an output unit of an external device (e.g., a TV, a smartphone, a tablet, etc.) instead of the robot 100*a*. The external device may communicate with the robot 100*a*, without being limited thereto.

The processor 180 of the robot 100*a* may acquire, using the communication unit 110, the input unit 120 and/or the sensing unit 140, the output data of the predetermined playback time point of the content which is being output via the robot 100*a* or the external device. The output data may refer to data indicating a scene or an event output at the predetermined playback time point of the content.

For example, the processor 180 may acquire, using the microphone 124, the output data (sound data) of the predetermined playback time point of the content which is being output via the speaker of the robot 100*a* or the external device. Alternatively, the processor 180 may acquire, using the camera 142, the output data (image data) of the predetermined playback time point of the content which is being output via a display of the external device. Alternatively, the processor 180 may acquire, via the communication unit 110, the output data (text data, sound data, image data, etc.) of the predetermined playback time point of the content which is being output from the external device. Alternatively, the processor 180 may acquire the output data (text data, sound data, image data, etc.) of the predetermined playback time point from content data stored in the memory 170.

The robot 100*a* may recognize an emotion corresponding to the acquired output data (S110). The processor 180 may recognize an emotion from various types of data such as text, speech, sound, facial expression and/or image included in the output data.

For example, the processor 180 may recognize meaning of text or speech and recognize an emotion corresponding to the recognized meaning. Alternatively, the processor 180 may recognize an emotion corresponding to sound based on characteristics, such as tempo or melody, of sound. Alternatively, the processor 180 may recognize an image, a facial expression of a person, a subtitle, etc. included in the image and may recognize an emotion corresponding to a recognition result.

To this end, the robot 100*a* may include an emotion recognizer (also referred to herein as an emotion processor) 800 (see FIG. 8) for recognizing the emotion corresponding to the output data. The emotion recognizer 800 may be implemented in hardware, software or a combination thereof. The emotion recognizer 800 will be described in detail below with reference to FIG. 8.

In some embodiments, step S110 may be performed by a separate server 200*a* (see FIG. 7) connected to the robot 100*a*. This will be described below with reference to FIG. 7.

The robot 100*a* may output an expression based on the recognized emotion (S120). The processor 180 may control at least one of the display 152, the speaker 154, the light output unit 156 or the rotation unit 160 to output an emotional expression corresponding to the recognized emotion, thereby more emotionally delivering the content which is being output.

For example, the processor 180 may output, via the display 152, the facial expression of the robot corresponding to the recognized emotion. Alternatively, the processor 180 may output, via the speaker 154, speech corresponding to the recognized emotion. Alternatively, the processor 180 may output, via the light output unit 156, light having a color or pattern corresponding to the recognized emotion. Alternatively, the processor 180 may control the rotation unit 160 and output motion of the robot corresponding to the recognized emotion.

Figure 7:
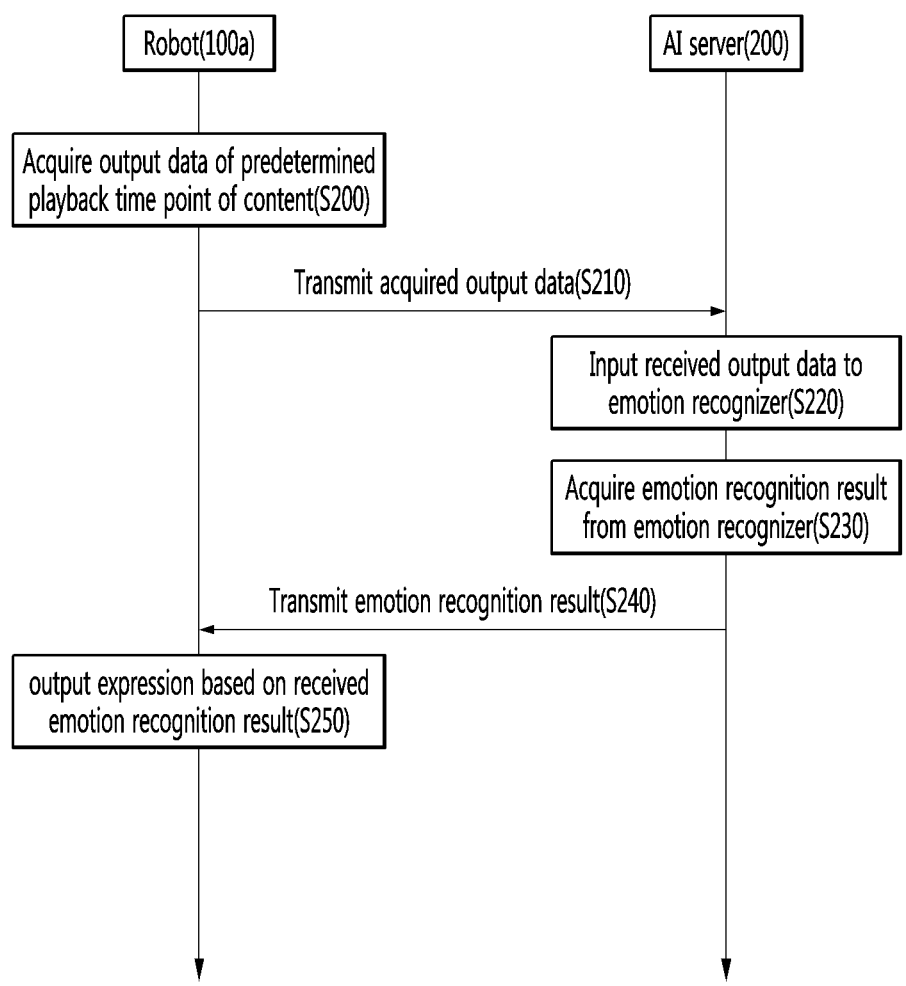
FIG. 7 is a ladder diagram illustrating an example of operation performed by a robot and a server connected thereto in association with the method of controlling the robot shown in FIG. 6.

FIG. 7 is a ladder diagram illustrating an example of operation performed by a robot and a server connected thereto in association with the method of controlling the robot shown in FIG. 6. Referring to FIG. 7, the robot 100*a* may acquire the output data of the predetermined playback time point of the content which is being output (S200), and transmit the acquired output data to the server 200*a* (S210).

The server 200*a* may input the received output data to the emotion recognizer 800 (see FIG. 8) (S220), and acquire an emotion recognition result from the emotion recognizer 800 (S230). According to the embodiment of FIG. 7, the emotion recognizer 800 may be implemented in hardware, software or a combination thereof in the server 200*a*. The processor 260 of the server 200*a* may recognize, using the emotion recognizer 800, an emotion corresponding to the acquired output data.

The server 200*a* may transmit the emotion recognition result to the robot 100*a* (S240). The robot 100*a* may output an expression (emotional expression) corresponding to the recognized emotion based on the received emotion recognition result (S250).

Figure 8:
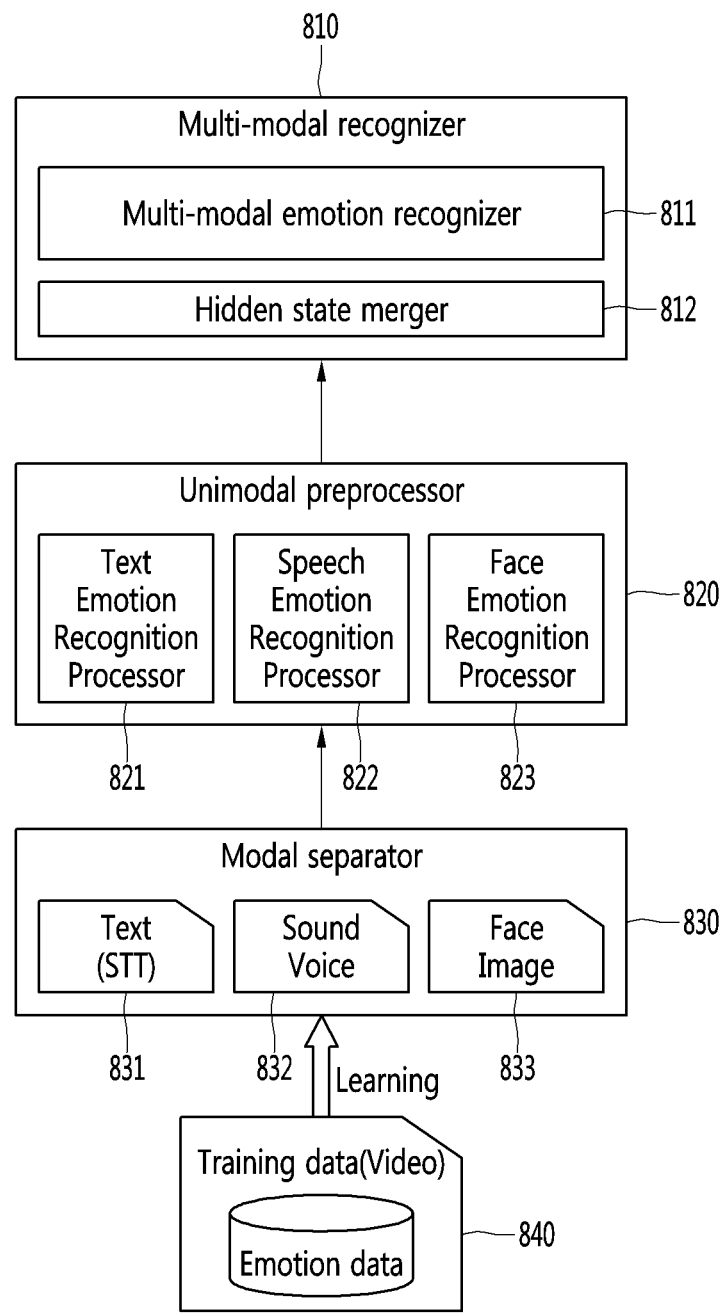
FIG. 8 is a simplified internal block diagram of an emotion recognizer according to an embodiment of the present disclosure.

Hereinafter, the emotion recognizer 800 will be described with reference to FIG. 8. FIG. 8 is a simplified internal block diagram of an emotion recognizer according to an embodiment of the present disclosure.

According to the embodiment of the present disclosure, the robot 100a or the server 200a may recognize the emotion of each user only using a face emotion recognizer 823 for recognizing an emotion from a face image 833 in the emotion recognizer 800. However, in some embodiments, the robot 100a or the server 200a may recognize the emotion of each user by additionally using the speech of each user.

Based on, referring to FIG. 8, the emotion recognizer 800 included in the robot 100a or the AI server 200a may perform deep learning using emotion data as input data 840. The emotion recognizer 800 according to the embodiment of the present disclosure may include a unimodal preprocessor 820 including a plurality of per-modal recognizers 821, 822 and 823 trained to recognize the emotion information of the user included in unimodal input data, and a multimodal recognizer 810 trained to merge output data of the plurality of per-modal recognizers 821, 822 and 823 and recognize emotion data of the user included in the merged data.

The emotion data is emotion information data having information on the emotion of the user and may include image, speech, bio signal data, which is emotion information used for emotion recognition. Preferably, the input data 840 may be video data including the face of the user. More preferably, the input data 840 may further include audio data including the speech of the user.

Emotion is the nature of mind that accepts a sensory stimulus or an impression or an ability to feel about a stimulus, is an internal high-dimensional psychological experience of a human to physical stimulus from the outside or environmental change in sensibility economics, and is defined as a complex emotion such as comfort or discomfort.

In this specification, emotion may mean feelings such as comfort and discomfort caused with respect to a stimulus and emotion may be recognized as any one of N representative emotional states. The N representative emotional states may be referred to as emotion classes.

For example, the emotion recognizer 800 may recognize six representative emotion classes such as surprise, happiness, sadness, displeasure, anger, and fear, and output one of the representative emotion classes as an emotion recognition result or output a probability value of each of the six representative emotion classes.

Alternatively, the emotion recognized and output by the emotion recognizer 800 according to the embodiment of the present disclosure may further include a neutrality emotion class indicating a default emotional state in which six emotions do not occur, in addition to the emotion classes such as surprise, happiness, sadness, displeasure, anger, and fear.

In this case, the emotion recognizer 800 may output any one emotion class selected from surprise, happiness, sadness, displeasure, anger, fear and neutrality as an emotion recognition result or output a probability value of each emotion class such as surprise x %, happiness x %, sadness x %, displeasure x %, anger x %, fear x % or neutrality x % as an emotion recognition result. When the emotion of the user is recognized using an artificial intelligence model that performs deep learning with respect to emotion to be recognized, a tagging value of data used during deep learning is output as a result value.

Meanwhile, in a real environment, the user may not show only one emotion. For example, although the user expresses joy through speech, displeasure may be expressed in a facial expression. As such, people may show different emotions according to modals such as speech, image or text. Accordingly, when the emotion of the user may be recognized to finally output one emotion value or different emotion, contradictory emotion, similar emotion, etc. of each of speech, image and text is ignored, emotion different from the actual emotion of the user may be recognized.

In order to recognize and manage each emotion based on all information on the user, which is revealed to the outside, the emotion recognizer 800 according to the embodiment of the present disclosure may have a structure capable of recognizing emotion for each unimodal of each of voice, image and text and recognizing emotion through a multimodal. That is, the emotion recognizer 800 according to the embodiment of the present disclosure may recognize the emotion of the user, which is input at a particular time point, for each unimodal and, at the same time, recognize emotion through a multi-modal.

Meanwhile, each of the plurality of per-modal recognizers 821, 822 and 823 recognizes and process one input unimodal input data and may be referred to as a unimodal recognizer. The emotion recognizer 800 according to the embodiment of the present disclosure may generate the plurality of unimodal input data, by separating the input data 840 for each unimodal. A modal separator 830 may separate the input data 840 into a plurality of unimodal input data.

Here, the plurality of unimodal input data may include image unimodal input data, sound unimodal input data and text unimodal input data separated from video data including the user. For example, the input data 840 may be video data in which the user is captured, and the video data may include video data in which the user's face is captured and audio data including the speech of the user.

In this case, the modal separator 830 may separate the data into text unimodal input data 831 obtained by converting the content of the audio data included in the input data 840 into text data and sound unimodal input data 832 of audio data, such as sound tone, magnitude, pitch, etc.

The text unimodal input data 831 may be data obtained by converting the speech separated from the video data into text. The sound unimodal input data 832 may be the sound source file of the audio file or a file obtained by performing preprocessing such as noise removal with respect to the sound source file.

In addition, the modal separator 830 may separate the image unimodal input data 833 including one or more face image data from the video data included in the input data 840. Meanwhile, the separated unimodal input data 831, 832 and 833 may be input to the unimodal preprocessor 820 including the plurality of per-modal recognizers 821, 822 and 823 trained to recognize the emotion information of the user based on the unimodal input data 831, 832 and 833.

For example, the text unimodal input data 831 may be input to the text emotion recognizer 821 for performing deep learning using text as training data. The sound unimodal input data 832 may be input to the speech emotion recognizer 822 for performing deep learning using sound as training data. The image unimodal input data 833 including one or more face image data may be input to the face emotion recognizer 823 for performing deep learning using the image as learning data.

The text emotion recognizer 821 may recognize a vocabulary, a sentence structure, etc. included in sound-to-text (STT) data to recognize the emotion of the user. For example, as words related to happiness are frequently used or as words having a higher degree of happiness are recognized, the probability value of the happiness emotion class is greater than those of the other emotion classes. Alternatively, the text emotion recognizer 821 may immediately output happiness which is the emotion class corresponding to the recognized text, as an emotion recognition result. In addition, the text emotion recognizer 821 may also output a text feature point vector along with the emotion recognition result.

The speech emotion recognizer 822 may extract feature points of input speech data. At this time, the speech feature points may include the tone, volume, waveform, etc. of the speech. The speech emotion recognizer 822 may detect the tone of the speech to determine the emotion of the user. In addition, the speech emotion recognizer 822 may output the emotion recognition result and the detected speech feature point vectors.

The face emotion recognizer 823 may detect the face area of the user from the input image data and recognize expression landmark point information which is feature points configuring the facial expression, thereby recognizing the expression of the user. In addition, the face emotion recognizer 823 may output the emotion class corresponding to the recognized expression or the probability value of each emotion class and may also output the face feature point (expression landmark point) vector.

Meanwhile, the plurality of per-modal recognizers may include an artificial neural network corresponding to the input characteristics of input unimodal input data. In addition, the multi-modal emotion recognizer 811 may also include an artificial neural network corresponding to the characteristics of the input data.

For example, the face emotion recognizer 823 for performing image based learning and recognition may include a convolutional neural network (CNN), the other emotion recognizers 821 and 822 may include a deep neural network (DNN), and the multi-modal emotion recognizer 811 may include an artificial neural network of a recurrent neural network (RNN).

The per-modal emotion recognizers 821, 822 and 823 may recognize the emotion information included in the input unimodal input data 831, 832 and 833 to output the emotion recognition result. For example, the per-modal emotion recognizers 821, 822 and 823 may output an emotion class having a highest probability among a predetermined number of preset emotion classes as the emotion recognition result or output the probability value of each emotion class as the emotion recognition result.

Meanwhile, the per-modal emotion recognizers 821, 822 and 823 may learn and recognize text, speech and image in each deep learning structure and derive an intermediate vector composed of a feature point vector of each unimodal. In addition, the multi-modal recognizer 810 may perform multi-modal deep learning with the intermediate vector of each speech, image and text. Since the input of the multi-modal recognizer 810 is generated based on the output of the per-modal emotion recognizers 821, 822 and 823, the per-modal emotion recognizers 821, 822 and 823 may operate as preprocessors.

Meanwhile, the emotion recognizer 800 according to the embodiment of the present disclosure may use a total of four deep learning models including deep learning models of three per-modal emotion recognizers 821, 822 and 823 and a deep learning model of one multi-modal recognizer 810.

Meanwhile, the multi-modal recognizer 810 may include a merger 812 for merging feature point vectors output from the plurality of per-modal recognizers 821, 822 and 823 and a multi-modal emotion recognizer 811 trained to recognize the emotion information of the user included in the output data of the merger 812.

Here, the merger 812 may synchronize the output data of the plurality of per-modal recognizers 821, 822 and 823 and vector-concatenate and output the feature point vectors to the multi-modal emotion recognizer 811. The multi-modal emotion recognizer 811 may recognize the emotion information of the user from the input data to output the emotion recognition result.

For example, the multi-modal emotion recognizer 811 may output an emotion class having a highest probability among the predetermined number of preset emotion classes as the emotion recognition result or output the probability value of each emotion class as the emotion recognition result. Therefore, the emotion recognizer 800 according to the embodiment of the present disclosure may output a plurality of unimodal emotion recognition results and one multi-modal emotion recognition result.

The emotion recognizer 800 according to the embodiment of the present disclosure may output a plurality of unimodal emotion recognition results and one multi-modal emotion recognition result as an emotion class level (probability). For example, the emotion recognizer 800 may output the probability of each emotion class of surprise, happiness, sadness, displeasure, anger, and fear. As the probability value increases, the possibility of being a recognized emotion class increases. Here, the sum of the probability values of seven types of emotion classes may be 100%.

The emotion recognizer 800 may output a complex emotion recognition result including the respective emotion recognition results 821, 822 and 823 of the plurality of per-modal recognizers and the emotion recognition result of the multi-modal recognizer 811. Therefore, the robot 100 may provide emotional interchange user experience (UX) based on three unimodal emotion recognition results and one multi-modal emotion recognition result.

According to settings, the emotion recognizer 800 may output a recognition result occupying a majority in the complex emotion recognition result and a recognition result having a highest probability value as a final recognition result. Alternatively, the processor 180 of the robot 100*a* or the processor 260 of the AI server 200, which has received the plurality of emotion recognition results, may determine the final recognition result according to a predetermined criterion.

The emotion recognizer 800 according to the present disclosure may recognize and manage the emotion of each of speech (speech tone, etc.), image (facial expression, etc.) and text (content of speech) as levels. Therefore, it is possible to differently process emotional interchange user experience (UX) according to modal.

In addition, the per-unimodal (speech, image and text) emotion recognition results and the multi-modal emotion recognition result may be simultaneously output based on one time point. Since it is possible to recognize the emotion using the speech, image and text input at one time point in a complex manner, it is possible to recognize contradictory emotion for each unimodal from the multi-modal emotion and to determine the emotion propensity of the user. Therefore, even if negative input is received in some modal, the overall emotion may be recognized to provide emotion interchange user experience (UX) corresponding to positive input which is the real emotional state of the user.

According to the present disclosure, the robot 100*a* may communicate with the emotion recognizer 800 or the AI server 200 including the emotion recognizer 800, thereby recognizing the unimodal emotion of the user. In addition, the emotion recognizer 800 may analyze the emotion pattern of the user and may be used for emotional care (treatment) with per-modal emotion recognition.

In a conventional emotion method, it is difficult to analyze the emotion by mapping the emotion to one in the case of contradictory emotion in which the per-modal recognition results of the input data are different. However, according to the emotion recognizer 800, it is possible to most suitably deal with various real-life situations through several inputs and outputs.

In order to complement an input recognizer having low performance, the emotion recognizer 800 may configure a recognizer structure in which the plurality of recognizers 811, 821 and 823 complements each other in a fusion manner of several inputs and outputs.

The emotion recognizer 800 according to the embodiment of the present disclosure may separate the speech into sound and meaning and make a total of three inputs including image, speech (sound) and STT from the image and speech inputs. In addition, in order to obtain optimal performance for each of three inputs, the emotion recognizer 800 may be configured to have different artificial neural network models for each input, such as a convolutional neural network (CNN) and a long short-term memory (LSTM). For example, the image based recognizer 823 may have a CNN structure and the multi-modal emotion recognizer 811 may have a long short-term memory (LSTM) structure. Therefore, a neural network customized to each input characteristic may be configured.

The outputs of the unimodal recognizers 821, 822 and 823 for each input may be a probability value of seven types of emotion classes and a vector value of feature points expressing this emotion well. The multi-modal recognizer 810 may connect vector values of feature points expressing emotions well through a fully-connected layer and an LSTM instead of calculating emotional values of three inputs using a statistical method, thereby helping performance improvement in a manner in which a problem that it is difficult for one recognizer to solve is solved by another recognizer and covering various cases in real life.

For example, even when speech is only heard at a place where it is difficult to recognize a face, the speech based recognizers 821 and 822 and the multi-modal emotion recognizer 811 may recognize the emotion of the user in the emotion recognizer 800 according to the embodiment of the present disclosure.

In addition, since the emotion recognizer 800 may recognize the complex emotional state of the user by fusing the recognition results of image, speech and text data and the multi-modal recognition result, it is possible to perform emotion recognition with respect to various situations in real life.

Figure 9:
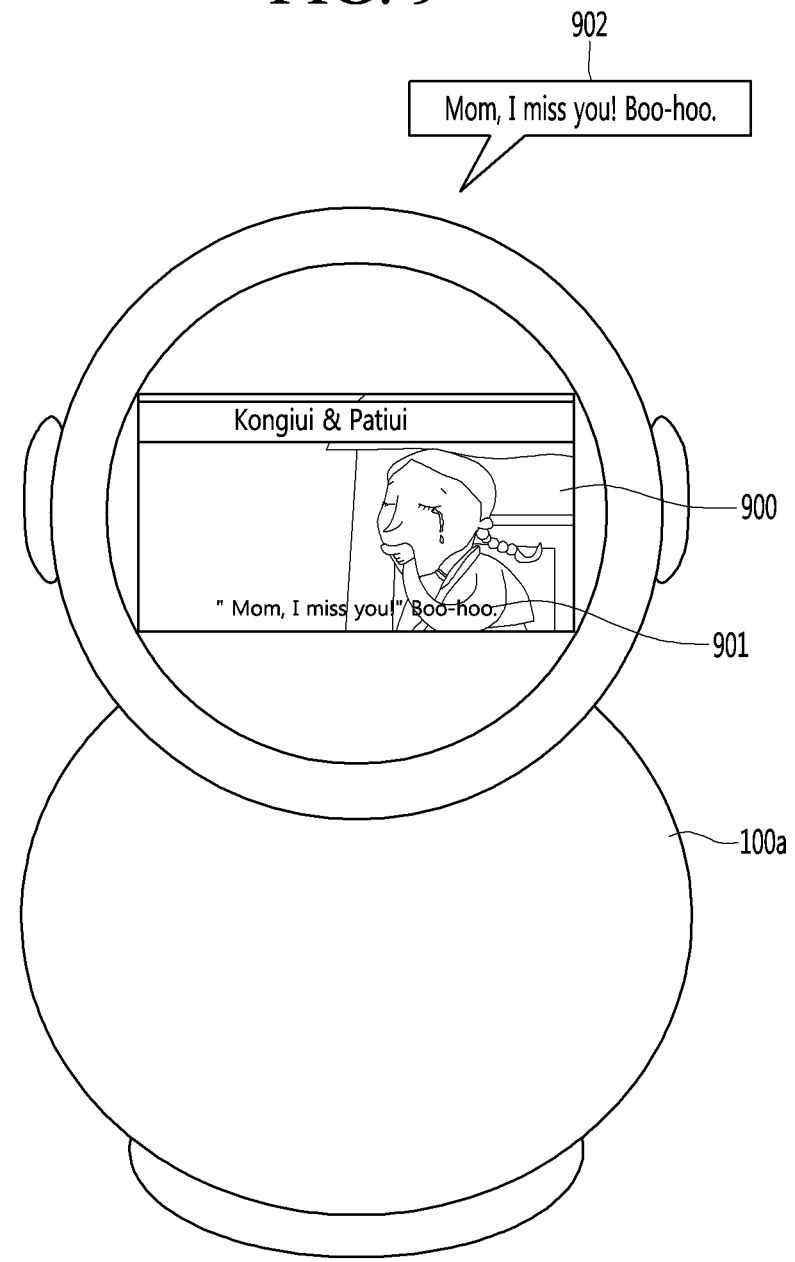
FIGS. 9 to 11 are views showing examples related to the embodiments shown in FIGS. 6 to 7.
Figure 10:
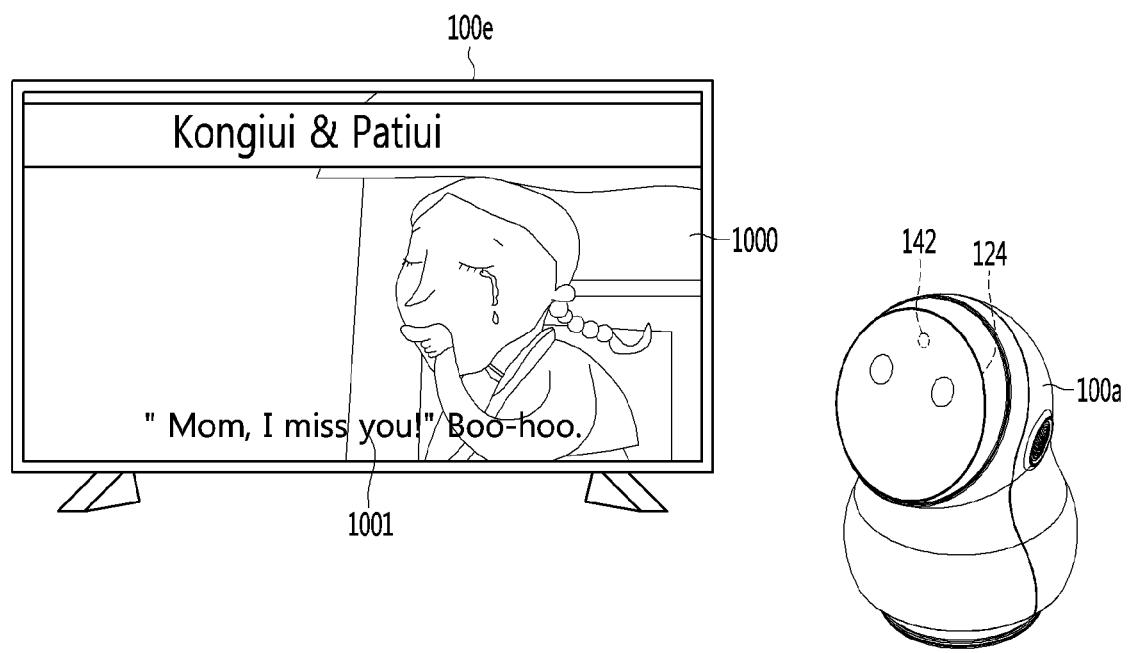
Figure 11:
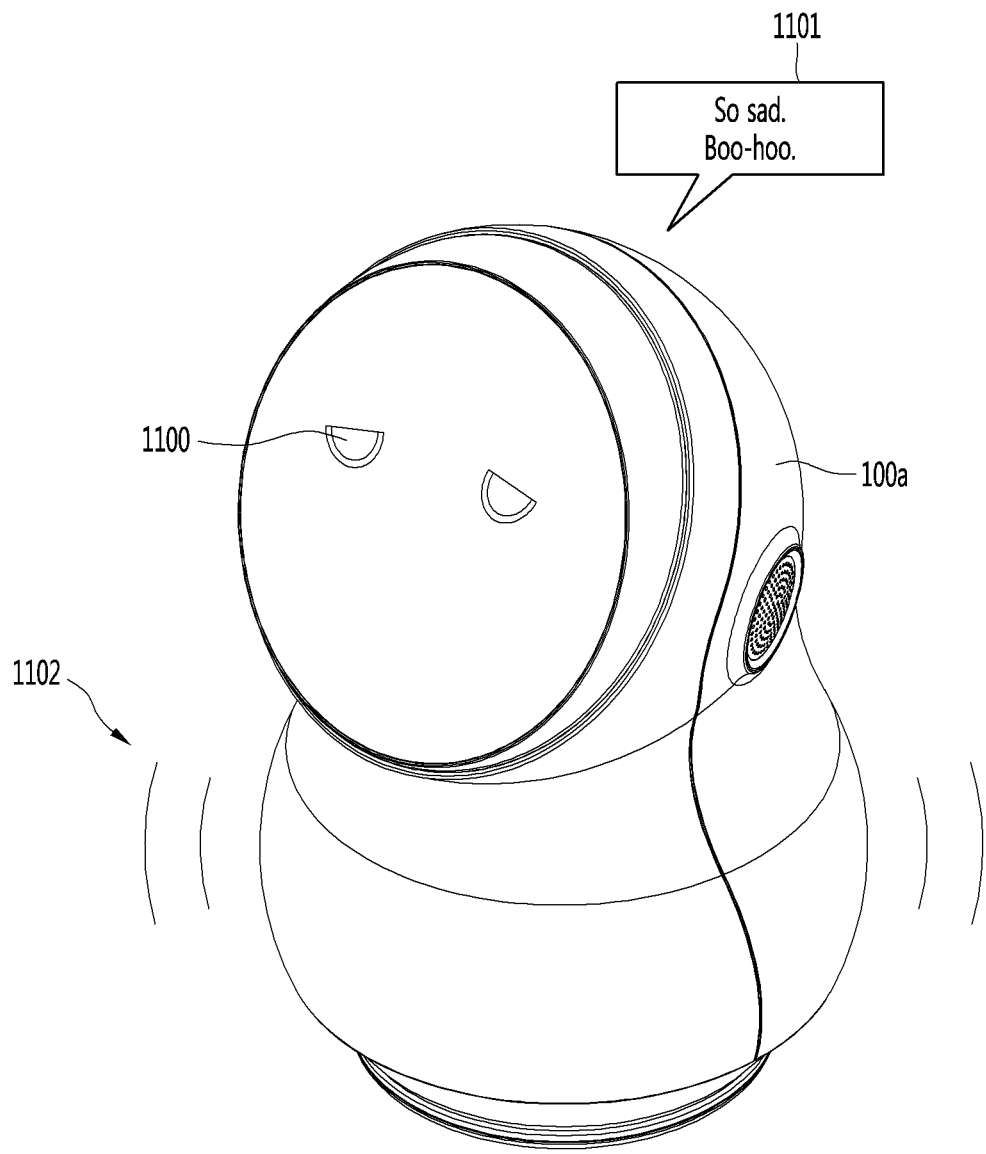

FIGS. 9 to 11 are views showing examples related to the embodiments shown in FIGS. 6 to 7. Referring to FIG. 9, the robot 100a may output content via the output unit 150. For example, the content may be a fairy tale content, and the fairy tale content may include an image output via the display 152 and speech (or sound) output via the speaker 154.

The processor 180 may acquire the output data of a predetermined playback time point while the content is output. For example, the processor 180 may periodically or continuously acquire the output data while the content is output.

In some embodiments, the processor 180 may acquire the output data at a point in time when a specific scene or event of the content is played back. In this case, information on the playback time point of the specific scene or event may be stored along with the data of the content. According to the embodiment of FIG. 9, the processor 180 may acquire, using the microphone 124, speech data corresponding to speech 902 which is being output via the speaker 154.

In addition, the processor 180 may acquire, via the display 152, image data corresponding to an image 900 which is being output or acquire text data corresponding to a subtitle 900 included in the image 900. The image data or text data may be stored in the memory 170 or may be acquired from content data received via the communication unit 110.

Referring to FIG. 10, the robot 100a may acquire the output data of the predetermined playback time point of the content which is being output from another external device 100e. For example, the processor 180 may acquire, via the camera 142, image data including a screen 1000 which is being output via the display of the external device 100e.

Alternatively, the processor 180 may acquire, via the microphone 124, speech data corresponding to speech which is being output through the speaker of the external device 100e. Alternatively, the processor 180 may acquire, via the communication unit 110, content data output at the predetermined playback time point from the external device 100e.

The robot 100a or the server 200a may recognize the emotion corresponding to the acquired output data according to the embodiment of FIG. 9 or 10. The processor 180 or 260 may input the acquired output data to the emotion recognizer 800. The emotion recognizer 800 may recognize the emotion via the per-modal recognizers 821, 822 and 823 according to the type of the output data. In addition, if the output data includes a plurality of data having different types (e.g., speech data and image data), the emotion recognizer 800 may finally recognize, using the multi-modal recognizer 810, the emotion from the recognition results of the per-modal recognizers 821, 822 and 823.

Referring to FIG. 11, the robot 100a may output an emotional expression corresponding to the recognized emotion. For example, if the recognized emotion corresponds to "sadness", the processor 180 may output, via the display 152, an image indicating the facial expression 1100 corresponding to sadness. In addition, the processor 180 may output, via the speaker 154, speech 1101 corresponding to sadness. In addition, the processor 180 may control the rotation unit 160 to output motion 1102 of the robot corresponding to sadness. One or at least two of the facial expression 1100, the speech 1101 or the motion 1102 may be output.

That is, according to the embodiments shown in FIGS. 6 to 11, the robot 100a outputs an emotional expression corresponding to an emotion recognized at a specific time point of content, thereby arousing sympathy with the user who is using the content. Therefore, it is possible to improve user's concentration on or immersion in the content and, as a result, to more efficiently deliver the content to the user.

Figure 12:
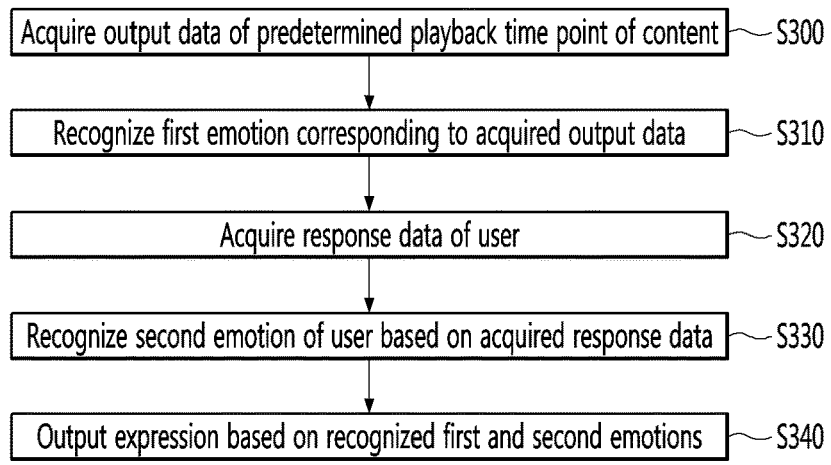
FIG. 12 is a flowchart illustrating a method of controlling a robot according to another embodiment of the present disclosure.

FIG. 12 is a flowchart illustrating a method of controlling a robot according to another embodiment of the present disclosure. Referring to FIG. 12, steps S300 to S310 are substantially equal to steps S100 to S110 of FIG. 6 and thus a description thereof will be omitted. That is, the first emotion of step S310 corresponds to the emotion recognized according to the embodiment of FIG. 6.

Continuously referring to FIG. 12, the robot 100a may acquire response data of the user at the predetermined playback time point of the content (S320). For example, the processor 180 may acquire the response data of the user during a period including the predetermined playback time point.

For example, the processor 180 may acquire the response data, by acquiring an image including the user via the camera 142. In some embodiments, the processor 180 may acquire the response data, by acquiring speech uttered by the user via the microphone 124.

The robot 100a or the server 200a may recognize the emotion (second emotion) of the user based on the acquired response data (S330). For example, the processor 180 or 260 may recognize the second emotion of the user via the emotion recognizer 800 from the response data acquired by the robot 100a. The emotion recognizer 800 may recognize the second emotion of the user at the predetermined playback time point of the content, based on the facial expression and/or speech of the user included in the response data.

The robot 100a may output an expression (emotional expression) via the output unit 150 based on the recognized first and second emotions (S340). The processor 180 or 260 may recognize a response to be caused by the robot 100a based on the recognized first and second emotions and set an expression to be output according to the recognized response.

The processor 180 of the robot 100a may control the output unit 150 to output the set expression. That is, the robot 100a may provide more diverse and rich emotional expressions, by outputting emotional expressions using a combination of the emotion recognized from the content and the emotion recognized from the user's response.

Figure 13:
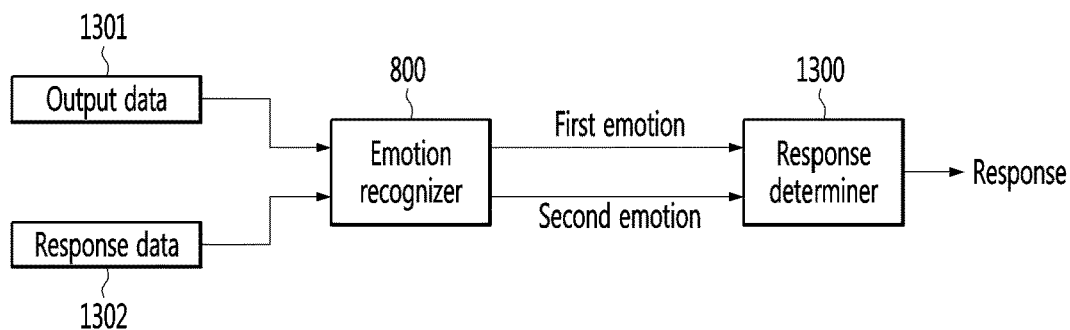
FIGS. 13 to 15 are views illustrating the embodiment of FIG. 12 in detail.
Figure 14:
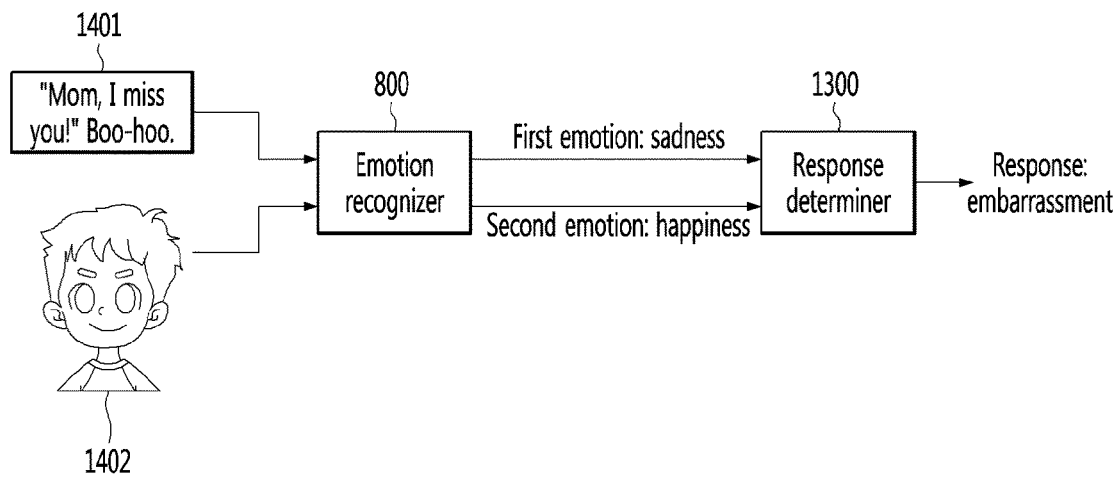
Figure 15:
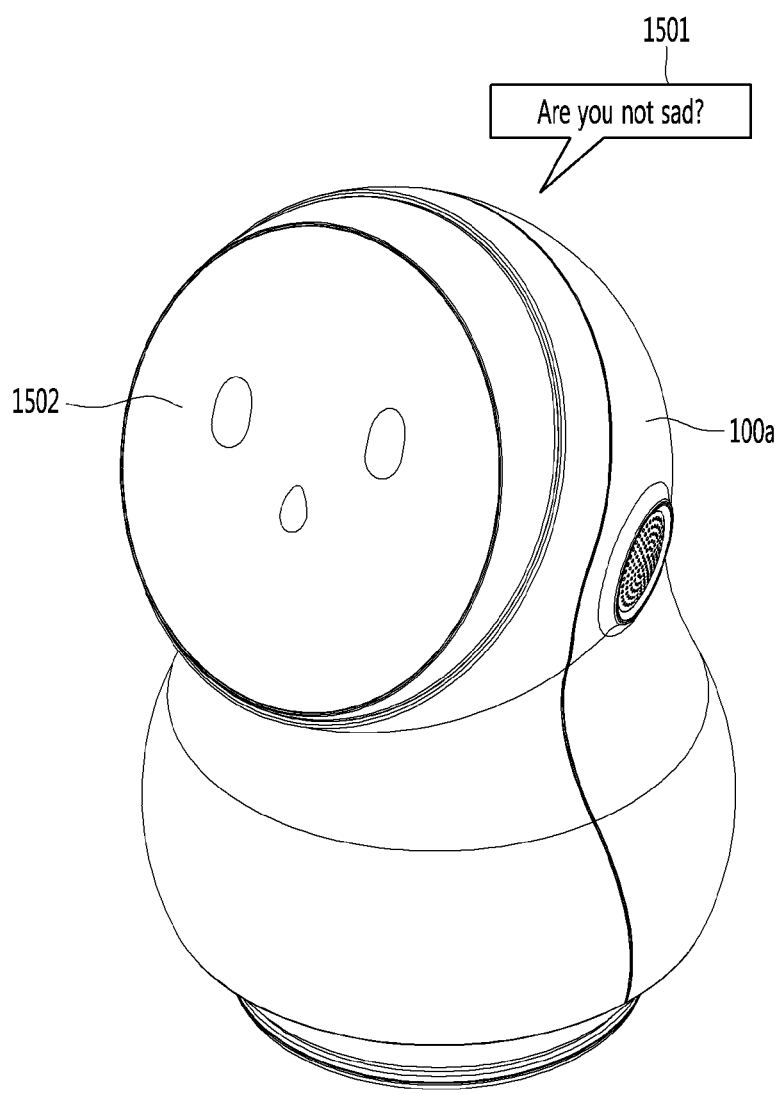

FIGS. 13 to 15 are views illustrating the embodiment of FIG. 12 in detail. Referring to FIG. 13, the robot 100a or the server 200a may include an emotion recognizer 800 and a response determiner 1300.

The emotion recognizer 800 may recognize a first emotion from output data 1301 acquired from content output at a predetermined playback time point. In addition, the emotion recognizer 800 may recognize a second emotion from response data 1302 of the user acquired in a period including the predetermined playback time point. That is, the first emotion corresponds to the content output at the predetermined playback time point and the second emotion corresponds to the emotion of the user at the predetermined playback time point.

The response determiner 1300 may determine (recognize) the response to be caused by the robot 100a based on the recognized first and second emotions. For example, the response determiner 1300 may recognize the response based on information (e.g., a matching table) on responses matching the type of the first emotion and the type of the second emotion. Alternatively, the response determiner 1300 may recognize the response from the first emotion and the second emotion, based on an artificial neural network trained based on machine learning.

Based on this, referring to the example of FIGS. 14 and 15, the processor 180 may acquire output data 1401 from the content output at the predetermined playback time point in the form of text or speech. In addition, the processor 180 may acquire image data 1402 including the face of the user via the camera 142, in the period including the predetermined playback time point. Meanwhile, if the emotion recognizer 800 is implemented in the server 200a, the processor 180 may transmit the acquired output data 1401 and the image data 1402 to the server 200a.

The processor 180 or 260 may input the output data 1401 and the image data 1402 to the emotion recognizer 800. The emotion recognizer 800 may recognize a first emotion corresponding to "sadness" based on meaning of speech or text included in the output data 1401. In addition, the emotion recognizer 800 may recognize a second emotion corresponding to "happiness" from the facial expression of the user included in the image data 1402.

The processor 180 or 260 may determine, via the response determiner 1300, the response to be caused by the robot 100a according to the first emotion and the second emotion. For example, the response determiner 1300 may recognize a response corresponding to "embarrassment" from the first emotion corresponding to "sadness" and the second emotion corresponding to "happiness", and provide a recognition result.

The processor 180 of the robot 100a may control the display 152, the speaker 154, the light output unit 156 and/or the rotation unit 160 to output an expression corresponding to the response, based on the response ("embarrassment") provided by the response determiner 1300. For example, the processor 180 may control the speaker 154 to output speech 1501 based on the response.

In some embodiments, the processor 180 may control the display 152 to output a facial expression 1502 based on the response. That is, according to the embodiment shown in FIGS. 12 to 15, the robot 100a may express various responses or emotions using the emotion recognized from the content and the emotion recognized from the response of the user. Therefore, the robot 100a may express more diverse and rich emotions and more accurately exchange emotion with the user.

According to the embodiments of the present disclosure, the robot can arouse sympathy with the user who is using the content, by outputting the emotional expression corresponding to the emotion recognized at a specific point in time of the content. Therefore, it is possible to improve user's concentration on or immersion in the content and, as a result, to more efficiently deliver the content to the user.

The robot can express various responses or emotions using the emotion recognized from the content and the emotion recognized from the response of the user. Therefore, the robot can express more diverse and rich emotions and more accurately exchange emotion with the user.

An aspect of the present disclosure provides a method of recognizing an emotion corresponding to content which is being output and allowing a robot to output an expression based on the recognized emotion. Another aspect of the present disclosure provides a robot capable of outputting an appropriate expression according to an emotion corresponding to content and an emotion of a user who uses content.

According to an embodiment, a robot includes an output interface including at least one of a display or a speaker, and a processor configured to acquire output data of a predetermined playback time point of content output via the robot or an external device, recognize a first emotion corresponding to the acquired output data, and control the output interface to output an expression based on the recognized first emotion.

In some embodiments, the output data may include sound data output at the predetermined playback time point of the content, and the processor may be configured to acquire the sound data via a microphone and recognize the first emotion based on at least one of speech or sound included in the sound data.

In some embodiments, the output data may include image data output at the predetermined playback time point, and the processor may be configured to recognize the first emotion based on at least one of an image, a facial expression of a person or a subtitle in the image data.

The robot may further include a camera configured to acquire the image data output via a display of the external device.

In some embodiments, the processor may be configured to output the content via the output interface, and acquire the output data of the predetermined playback time point among data related to the content stored in a memory, and the output data may include at least one of sound data, image data or text data.

In some embodiments, the content may be output via the external device, and the processor may be configured to receive the output data of the predetermined playback time point from the external device via a communication transceiver.

In some embodiments, the processor may be configured to input the output data to an emotion recognizer trained based on machine learning and acquire an emotion recognition result of the output data from the emotion recognizer.

The emotion recognition result may include respective probability values of a plurality of emotion classes, and the processor may be configured to recognize an emotion class having a highest probability value among the probability values as a first emotion at the output data.

In some embodiments, the processor may be configured to transmit the output data to the server via the communication transceiver, receive an emotion recognition result of the output data from the server, and control the output interface to output an expression based on the received emotion recognition result.

The output expression may include at least one of a facial expression of the robot output via the display based on the recognized first emotion or speech of the robot output via the speaker based on the recognized first emotion. In some embodiments, the robot may further include a rotator including at least one motor configured to move the robot, and the output expression may further include motion of the robot provided via driving of the rotator based on the recognized first emotion.

In some embodiments, the processor may be configured to control the camera to acquire an image including a user in a period including the predetermined playback time point, recognize a second expression of the user based on the acquired image, and control the output interface to output an expression corresponding to a response recognized based on the first emotion and the second emotion.

According to another embodiment, a method of controlling a robot includes acquiring output data of a predetermined playback time point of content output via the robot or an external device, recognizing a first emotion corresponding to the acquired output data, and outputting an expression based on the recognized first emotion via an output interface including at least one of a display or a speaker.

In certain embodiments, a robot comprises: an output interface including at least one of a display or a speaker; and a processor configured to: acquire output data associated with content outputted via the robot or an external device, recognize a first emotion corresponding to the acquired output data, and control the output interface to output an expression based on the first emotion.

The output data may include sound data associated with outputting the content, and the processor may be configured to: acquire the sound data via a microphone, and recognize the first emotion based on at least one of speech or sound included in the sound data.

The output data may include image data associated with outputting the content, and the processor may be configured to recognize the first emotion based on at least one of an image, a facial expression of a person, or a subtitle in the image data.

The content may be outputted via the external device, and the robot may further comprise a camera configured to acquire the image data from the external device outputting the particular portion of the content.

The processor may be further configured to: output the content via the output interface, and acquire the output data associated with outputting the content from data related to the content stored in a memory, and the output data may include at least one of sound data, image data, or text data associated with outputting the content.

The content may be output via the external device, the processor may be configured to receive the output data associated with outputting the content from the external device via a communication transceiver, and the output data may include at least one of sound data, image data, or text data associated with the content.

The processor may be configured to: input the output data to an emotion processor that is trained based on machine learning, and acquire an emotion recognition result of the output data from the emotion processor. The emotion recognition result may include respective probability values of a plurality of emotion classes, and wherein the processor may be configured to recognize one of the plurality of emotion classes having a highest probability value among the probability values as the first emotion.

The robot may further comprise a communication transceiver configured to establish a connection with a server, and the processor may be configured to: transmit the output data to the server, receive an emotion recognition result of the output data from the server, and control the output interface to output the expression based on the received emotion recognition result.

The outputted expression may include at least one of a representation of a facial expression that is outputted via the display and selected based on the first emotion or audio corresponding to speech that is outputted via the speaker and selected based on the first emotion.

The robot may further comprise at least one motor configured to move the robot, the outputted expression may further include a motion of the robot that is provided via driving of the at least one motor and is selected based on the first emotion.

The robot may comprise a camera, and the processor may be configured to: control the camera to acquire an image of a user while content is being outputted, recognize a second emotion of the user based on the acquired image, and control the output interface to output a response that is determined based on the first emotion and the second emotion.

In certain implementations, a method of controlling a robot may comprise: acquiring output data associated with outputting content outputted via the robot or an external device; recognizing a first emotion corresponding to the output data; and outputting an expression based on the first emotion via an output interface included in the robot and including at least one of a display or a speaker.

In this method, the acquiring of the output data may include acquiring sound data output associated with outputting the content via a microphone, and the recognizing of the first emotion may be include recognizing the first emotion based on at least one of speech or sound included in the sound data.

The output data may include image data associated with outputting the content, and the recognizing of the first emotion may include recognizing the first emotion based on at least one of an image, a facial expression of a person, or a subtitle in the image data.

The acquiring of the output data may include acquiring, using a camera of the robot, the image data as the content is being outputted via a display of the external device.

The outputting of the expression may include at least one of: outputting a facial expression of the robot based on the first emotion via the display; outputting speech of the robot based on the first emotion via the speaker; or performing a motion of the robot based on the first emotion.

The method may further comprise: acquiring an image of a user when the content is being outputted; recognizing a second emotion of the user based on the acquired image; and outputting a response that is determined based on the first emotion and the second emotion.

The method may further comprise: inputting the output data to an emotion processor that is trained based on machine learning, and acquiring an emotion recognition result of the output data from the emotion processor. The emotion recognition result may include respective probability values of a plurality of emotion classes, and the method may further comprise recognizing one of the plurality of emotion classes having a highest probability value among the probability values as the first emotion.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot comprising:
an output interface including at least one of a display or a speaker;
a memory configured to store a content; and
a processor configured to:
acquire, from the memory, content data associated with the content which is being outputted via the output interface of the robot,
recognize a first emotion corresponding to the content data including at least one of sound data, image data or text data of a predetermined playback time point of the content while the content is being outputted via the output interface of the robot, and
control the output interface to output an expression based on the first emotion.

2. The robot of claim 1,
wherein the processor is configured to:
acquire additional sound data via a microphone of the robot, and
recognize the first emotion using a first emotion recognizer based on at least one of speech or sound included in the additional sound data of the predetermined playback time point of the acquired content data.

3. The robot of claim 1, wherein the processor is configured to recognize the first emotion using a second emotion recognizer based on at least one of an image, a facial expression of a person, or a subtitle in the image data of the predetermined playback time point of the acquired content data.

4. The robot of claim 1, wherein the processor is configured to recognize the first emotion using a third emotion recognizer based on the text data of the predetermined playback time point of the acquired content data.

5. The robot of claim 1, further comprising a microphone to acquire additional sound data,
wherein the processor is configured to recognize the first emotion using at least one of:
  a first emotion recognizer based on at least one of speech or sound included in the additional sound data of the predetermined playback time point of the acquired content data,
  a second emotion recognizer based on at least one of an image, a facial expression of a person, or a subtitle in the image data of the predetermined playback time point of the acquired content data, or
  a third emotion recognizer based on the text data of the predetermined playback time point of the acquired content data, and
wherein the processor is configured to:
  input the content data to an emotion recognition processor that is trained based on machine learning using a multi-modal recognizer and at least one of the first emotion recognizer, the second emotion recognizer or the third emotion recognizer,
  acquire an emotion recognition result including respective probability values of a plurality of emotion classes of the content data from the emotion recognition processor, and
  recognize one of the plurality of emotion classes having a highest probability value among the probability values as the first emotion.

6. The robot of claim 1, further comprising:
a communication transceiver configured to establish a connection with a server; server; and
a microphone to acquire additional sound data,
wherein the processor is configured to recognize the first emotion using at least one of:
  a first emotion recognizer based on at least one of speech or sound included in the additional sound data of the predetermined playback time point of the acquired content data,
  a second emotion recognizer based on at least one of an image, a facial expression of a person, or a subtitle in the image data of the predetermined playback time point of the acquired content data, or
  a third emotion recognizer based on the text data of the predetermined playback time point of the acquired content data, and,
wherein the processor is configured to:
transmit the content data to a server,
receive an emotion recognition result including respective probability values of a plurality of emotion classes of the content data from the server, which is determined based on a multi-modal recognizer and at least one of the first emotion recognizer, the second emotion recognizer or the third emotion recognizer, and
recognize one of the plurality of emotion classes having a highest probability value among the probability values as the first emotion.

7. The robot of claim 1, wherein the processor is configured to:
control a camera to acquire an image of a user during a period including the predetermined playback time point of the content while the content is being outputted,
acquire response data based on at least one of a facial expression or speech of the user,
recognize a second emotion of the user based on the acquired response data, and
control the output interface to output an expression corresponding to a response emotion determined among a plurality of emotion classes using machine learning based on the first emotion and the second emotion.

8. The robot of claim 1,
wherein the
outputted expression includes at least one of a representation of a facial expression that is outputted via the display, audio corresponding to speech that is outputted via the speaker, or a motion of the robot that is provided via driving of at least one motor configured to move the robot.

9. A robot comprising:
an output interface including at least one of a display or a speaker;
an input interface including at least one of a camera or a microphone; and
a processor configured to:
  acquire, via the input interface, content data associated with a content which is being outputted via an external device,
  recognize a first emotion corresponding to the content data including at least one of sound data, image data or text data of a predetermined playback time point of the content while the content is being outputted via the external device, and
  control the output interface to output an expression based on the first emotion.

10. The robot of claim 9, wherein the processor is configured to:
input the content data to an emotion recognition processor that is trained based on machine learning using a multi-modal recognizer and at least one of a first emotion recognizer based on at least one of speech or sound included in the sound data of the predetermined playback time point of the acquired content data, a second emotion recognizer based on at least one of an image, a facial expression of a person, or a subtitle in the image data of the predetermined playback time point of the acquired content data, or a third emotion recognizer based on the text data of the predetermined playback time point of the acquired content data,
acquire an emotion recognition result including respective probability values of a plurality of emotion classes of the content data from the emotion recognition processor, and
recognize one of the plurality of emotion classes having a highest probability value among the probability values as the first emotion.

11. The robot of claim 2,
wherein the processor is configured to:
control a camera to acquire an image of a user during a period including the predetermined playback time point of the content while the content is being outputted, acquire response data based on at least one of a facial expression or speech of the user, recognize a second emotion of the user based on the acquired response data, and control the output interface to output an expression corresponding to a response emotion determined among a plurality of emotion classes using machine learning based on the first emotion and the second emotion.

12. The robot of claim 9,
wherein the outputted expression includes at least one of a representation of a facial expression that is outputted via the display, audio corresponding to speech that is outputted via the speaker, or a motion of the robot that is provided via driving of at least one motor configured to move the robot.

13. A method of controlling a robot, the method comprising:
acquiring, from a memory, content data associated with content which is being outputted via an output interface of the robot;
inputting the content data including at least one of sound data, image data or text data of a predetermined playback time point of the content to an emotion recognition processor that is trained based on machine learning;
acquiring an emotion recognition result of the content data including respective probability values of a plurality of emotion classes from the emotion recognition processor;
recognizing one of the plurality of emotion classes having a highest probability value among the probability values as a first emotion; and
outputting an expression based on the first emotion via the output interface including at least one of a display or a speaker.

14. The method of claim 13,
wherein the acquiring of the content data includes acquiring, via a microphone of the robot, additional sound data associated with the content which is being outputted, and
wherein the recognizing of the first emotion includes recognizing the first emotion using a first emotion recognizer based on at least one of speech or sound included in the additional sound data of the predetermined playback time point of the acquired content data.

15. The method of claim 13,
wherein the content data includes the image data associated with the content which is being outputted, and
wherein the recognizing of the first emotion includes recognizing the first emotion using a second emotion recognizer based on at least one of an image, a facial expression of a person, or a subtitle in the image data of the predetermined playback time point of the acquired content data.

16. The method of claim 15, wherein the content data includes the text data associated with the content which is being outputted, and
wherein the recognizing of the first emotion includes recognizing the first emotion using a third emotion recognizer based on the text data of the predetermined playback time point of the acquired content data.

17. The method of claim 13, wherein the outputting of the expression includes at least one of:
outputting a facial expression of the robot based on the first emotion via the display;
outputting speech of the robot based on the first emotion via the speaker; or
performing a motion of the robot based on the first emotion.

18. The method of claim 13, further comprising:
controlling a camera to acquire an image of a user during a period including the predetermined playback time point of the content while the content is being outputted,
acquiring response data based on at least one of a facial expression or speech of the user,
recognizing a second emotion of the user based on the acquired response data, and
controlling the output interface to output an expression corresponding to a response emotion determined among a plurality of emotion classes using machine learning based on the first emotion and the second emotion.

19. A method of controlling a robot, the method comprising:
acquiring, via an input interface including at least one of a camera or a microphone, content data associated with a content which is being outputted via an external device;
inputting the content data including at least one of sound data, image data or text data of a predetermined playback time point of the content to an emotion recognition processor that is trained based on machine learning;
acquiring an emotion recognition result of the content data including respective probability values of a plurality of emotion classes from the emotion recognition processor;
recognizing one of the plurality of emotion classes having a highest probability value among the probability values as a first emotion; and
controlling an output interface of the robot to output an expression based on the first emotion.

20. The method of claim 19,
further comprising:
controlling a camera to acquire an image of a user during a period including the predetermined playback time point of the content while the content is being outputted,
acquiring response data based on at least one of a facial expression or speech of the user,
recognizing a second emotion of the user based on the acquired response data, and
controlling the output interface to output an expression corresponding to a response emotion determined among a plurality of emotion classes using machine learning based on the first emotion and the second emotion.

* * * * *